United States Patent
Wennerstrom

(10) Patent No.: US 10,099,225 B2
(45) Date of Patent: Oct. 16, 2018

(54) AIR CLEANING DEVICE

(71) Applicant: Blueair AB, Stockholm (SE)

(72) Inventor: Johan Wennerstrom, Sollentuna (SE)

(73) Assignee: BLUEAIR AB (SE)

( * ) Notice: Subject to any disclaimer, the term of this patent is extended or adjusted under 35 U.S.C. 154(b) by 216 days.

(21) Appl. No.: 15/150,823

(22) Filed: May 10, 2016

(65) Prior Publication Data

US 2016/0332170 A1 Nov. 17, 2016

(30) Foreign Application Priority Data

May 12, 2015 (EP) .................................... 15167378

(51) Int. Cl.
  *B03C 3/41* (2006.01)
  *B03C 3/45* (2006.01)
  *F24F 1/02* (2011.01)
  *F24F 3/16* (2006.01)
  *B01D 46/00* (2006.01)
  *B03C 3/155* (2006.01)
  *B03C 3/32* (2006.01)
  (Continued)

(52) U.S. Cl.
  CPC ............ *B03C 3/41* (2013.01); *B01D 46/0032* (2013.01); *B03C 3/155* (2013.01); *B03C 3/32* (2013.01); *B03C 3/368* (2013.01); *B03C 3/45* (2013.01); *B03C 3/49* (2013.01); *F24F 1/025* (2013.01); *F24F 3/166* (2013.01); *B03C 2201/06* (2013.01); *B03C 2201/10* (2013.01); *F24F 2003/1682* (2013.01)

(58) Field of Classification Search
  CPC combination set(s) only.
  See application file for complete search history.

(56) References Cited

U.S. PATENT DOCUMENTS 2,973,054 A * 2/1961 Kurtz ..................... B03C 3/155
                                                              96/66
3,763,632 A * 10/1973 Imris ........................ B03C 3/41
                                                              96/95

(Continued)

FOREIGN PATENT DOCUMENTS

EP          0980290 B1      2/2000
JP         62087262 A  *  10/1985
(Continued)

*Primary Examiner* — Duane Smith
*Assistant Examiner* — Sonji Turner
(74) *Attorney, Agent, or Firm* — Condo Roccia Koptiw LLP

(57) ABSTRACT

An air cleaning device for separating airborne particles from a flow of air is provided. The air cleaning device comprises a separating unit and an ionizing unit arranged to charge airborne particles present in the flow of air and transmit at least a major part of the charged particles towards the separating unit. The ionizing unit comprises at least one collector electrode and at least one emitter electrode. The separating unit is arranged to attract at least some of the charged particles so as to separate them from the flow of air. Further, the at least one collector electrode is shaped so as to conduct at least a portion of the flow of air and has a spherically curved inner surface and the emitter electrode is centered with respect to the spherically curved inner surface of the collector electrode.

18 Claims, 2 Drawing Sheets

(51) Int. Cl.
*B03C 3/36* (2006.01)
*B03C 3/49* (2006.01)

(56) References Cited

U.S. PATENT DOCUMENTS

| | | | | |
|---|---|---|---|---|
| 4,194,888 A | * | 3/1980 | Schwab | B01D 47/10 95/78 |
| 5,034,032 A | * | 7/1991 | Yikai | B01D 46/00 96/55 |
| 6,203,600 B1 | * | 3/2001 | Loreth | B03C 3/49 264/280 |
| 6,365,112 B1 | * | 4/2002 | Babko-Malyi | B01D 53/323 204/164 |
| 6,398,852 B1 | * | 6/2002 | Loreth | B03C 3/32 55/498 |
| 7,014,686 B2 | * | 3/2006 | Gatchell | B03C 3/08 96/51 |
| 7,517,503 B2 | * | 4/2009 | Botvinnik | F24F 3/166 422/121 |
| 7,638,104 B2 | * | 12/2009 | Taylor | B03C 3/12 422/186.04 |
| 8,834,799 B2 | * | 9/2014 | Loreth | B03C 3/12 422/121 |
| 9,694,369 B2 | * | 7/2017 | Engberg | B03C 3/368 |
| 2005/0082160 A1 | * | 4/2005 | Botvinnik | A61L 9/22 204/164 |
| 2016/0229267 A1 | * | 8/2016 | Wennerstrom | B03C 3/49 |
| 2017/0203304 A1 | * | 7/2017 | Roux | B03C 3/06 |

FOREIGN PATENT DOCUMENTS

| | | | |
|---|---|---|---|
| WO | WO-9839100 A1 * | 9/1998 | B03C 3/32 |
| WO | WO 98/50162 | 11/1998 | |

* cited by examiner

AIR CLEANING DEVICE

CROSS-REFERENCE TO RELATED APPLICATIONS

This application claims the benefit of European Patent Application No. 15167378.7, filed May 12, 2015, the contents of which are hereby incorporated by reference herein.

THE FIELD OF THE INVENTION

The present invention generally relates to the field of air cleaning devices. In particular, the present invention relates to air cleaning devices having an ionizing unit.

BACKGROUND OF THE INVENTION

Air cleaning devices comprising a filter with a filter medium of dielectric and/or pre-charged material and ionizing means for charging airborne particles before they hit the filter are proven to be more efficient than air cleaning devices merely utilizing a filter. The particles charged by the ionizing means are attracted by the fibers of the filter by electrostatic force. An example of such an air cleaning device is disclosed in EP 980290 B1. However, in the field of air cleaning, there is a need to further improve the air cleaning efficiency of air cleaning devices.

SUMMARY OF THE INVENTION

It would be desirable to enable an air cleaning device with improved air cleaning efficiency. The present invention is advantageous in that the air cleaning efficiency of the air cleaning device is improved.

To better address this concern, an air cleaning device having the features defined in the independent claim is provided. Preferable embodiments are defined in the dependent claims.

Hence, according to an aspect, an air cleaning device for separating airborne particles from a flow of air is provided. The air cleaning device comprises a separating unit and an ionizing unit arranged to charge airborne particles present in the flow of air and transmit at least a major part of the charged particles towards the separating unit. The ionizing unit comprises at least one collector electrode and at least one emitter electrode. The separating unit is arranged to attract at least some of the charged particles so as to separate them from the flow of air. Further, the at least one collector electrode is shaped so as to conduct at least a portion of the flow of air and has a spherically curved inner surface and the emitter electrode is centered with respect to the spherically curved inner surface of the collector electrode.

When the air cleaning device operates, a voltage may be applied over the emitter electrode and the collector electrode, whereby an electric field is obtained between the emitter electrode and the collector electrode. Corona discharges occur at the emitter electrode, whereby molecules in the air get charged (ionized) and turn into ions. The ions travel in the electric field towards the collector electrode and collide with particles present in the air flow conducted by the collector electrode, whereby these particles get charged (ionized). In the present specification, the term "ionization field" will be used to indicate the field between the collector electrode and the emitter electrode where particles can be charged. The voltage applied over the emitter electrode and the collector electrode and the dimensions of the electrodes may preferably be adapted such that a major part of the particles that has been charged passes (are transmitted by) the collector electrode (instead of adhering to the collector electrode) and continues to travel to the separating unit, where at least some of the charged particles are attracted (or collected).

According to the present aspect, the inner surface of the collector electrode is spherically curved and the emitter electrode is positioned at (e.g. on or close to) a center point of the spherically curved inner surface. In the present specification, the center point of the spherically curved inner surface means the point from which each point of the spherically curved inner surface is equidistant. With the present arrangement of the collector and emitter electrodes, an ionization field having a larger uniform portion (between the emitter electrode and the inner surface of the collector electrode) is provided, whereby the airborne particles in the flow of air travel a longer distance in this uniform portion of the ionization field, which in turn increases the ionization efficiency of the ionizing unit. Hence, the particles passing the ionization field get a higher charge when passing the ionizing unit and may then more easily be captured by the separating unit, whereby the overall air cleaning efficiency of the air cleaning device is improved.

The inner surface of the collector electrode being spherically curved may include that the inner surface forms a portion of a sphere and/or has an at least partially sphere-like shape. For example, at least the points of the inner surface of the collector electrode being located closest to the emitter electrode may be (at least almost) equidistant from the center point (and preferably from the emitter electrode). It will be appreciated that the inner surface may not necessarily be exactly spherically curved, but small deviations from an exact spherical shape may be envisaged as long as the overall outline of the inner surface is at least substantially spherically curved.

In an embodiment, the collector electrode may be located in a conduit of the air cleaning device, in which conduit the air flow travels and may preferably constitute a portion of the conduit.

According to an embodiment, the at least one collector electrode may have an inlet and an outlet for the flow of air. For example, the flow of air may enter the collector electrode via the inlet, pass the spherically curved inner surface and exit the collector electrode via the outlet.

According to an embodiment, a diameter of the inlet may be larger than a diameter of the outlet, so as to provide a less turbulent flow of air inside the collector electrode.

According to an embodiment, a ratio of a diameter of the outlet to a diameter of the inlet may be comprised within the range of 0.25 to 0.75, such as within the range of 0.4 to 0.6, such as around 0.5. With the present embodiment, a sufficiently large portion of spherically curved inner surface of the collector electrode is provided so as to provide a relatively large uniform portion of the ionization field, whereby the ionization efficiency of the ionizing unit is enhanced. Still, a sufficiently large outlet is provided so as to provide a facilitated flow of air through the collector electrode.

According to an embodiment, the spherically curved inner surface may extend from the inlet to the outlet. That is, the spherically curved inner surface may interconnect the inlet and the outlet. For example, the inlet and outlet may be formed in the spherically curved inner surface. Hence, the air flow carrying the particles may enter the inlet, pass the spherically curved inner surface and exit the collector electrode via the outlet.

According to an embodiment, the emitter electrode being centered with respect to the spherically curved inner surface of the collector electrode may include that a distance from the at least one emitter electrode (such as from a center of the emitter electrode) to the centre point of the spherically curved inner surface is less than 10%, and preferably less than 5%, of the radius of the inlet. Hence, a slight deviation from an exact concentration may be envisaged.

According to an embodiment, the separating unit may comprise a filter with a filter medium adapted to attract at least some of the charged particles. For example, the filter medium may include a dielectric material, such as polypropylene. Dielectric fibrous material may attract charged particles even if it is not pre-charged. When charged particles come close to the fibers of the dielectric filter medium, a polarization of the molecules of the fibers takes place. For example, if a particle having a positive charging comes close to a filter fiber, the molecule polarization gives an induced negative charge on the surface of the fiber. A fiber that comprises a lot of such polarized molecules will have a negative side and a positive side. Charged particles that pass through the filter unit, after chargings have been induced upon the surfaces of the fibers, will adhere to (be attracted by) the fibers. This process is described in more detail in EP 0980290 B1 by the same applicant, which is hereby incorporated by reference.

The filter medium may be non-pre-charged or, alternatively, pre-charged and may in the latter case be referred to as an electret filter. Alternatively, it may be envisaged that the separating unit may comprise an electrostatic precipitator for attracting the charged particles.

According to an embodiment, the ionizing unit may be adapted to operate within a range of 3 to 15 kV. That is, the voltage (i.e. potential difference) applied over the emitter electrode and the collector electrode may be within the range of 3 to 15 kV (direct current, DC). This operating voltage range is adapted so as to provide an appropriate ionization field for charging particles. For example, the collector electrode may be connected to ground while the potential at the emitter electrode is −3 to −15 kVDC or +3 to +15 kVDC.

According to an embodiment, the at least one emitter electrode may comprise at least one tip centered with respect to the spherically curved inner surface, whereby corona discharge from the emitter electrode is facilitated. Further, since the tip is centered with respect to the spherically curved inner surface, each point of the spherically curved inner surface is (at least almost) equidistant from the tip of the emitter electrode, whereby the ionization field is more uniform. For example, the at least one emitter electrode may be a brush electrode (comprising a plurality of tips) or a needle tip electrode.

According to an embodiment, the air cleaning device may further comprise a fan arranged to obtain the flow of air. Hence, the fan may force air through the ionization unit and the separating unit. The fan may be positioned anywhere in the air cleaning device suitable for obtaining the flow of air, such as downstream of the separating unit or upstream of the ionization unit.

It is noted that embodiments of the invention relates to all possible combinations of features recited in the claims.

BRIEF DESCRIPTION OF THE DRAWINGS

These and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
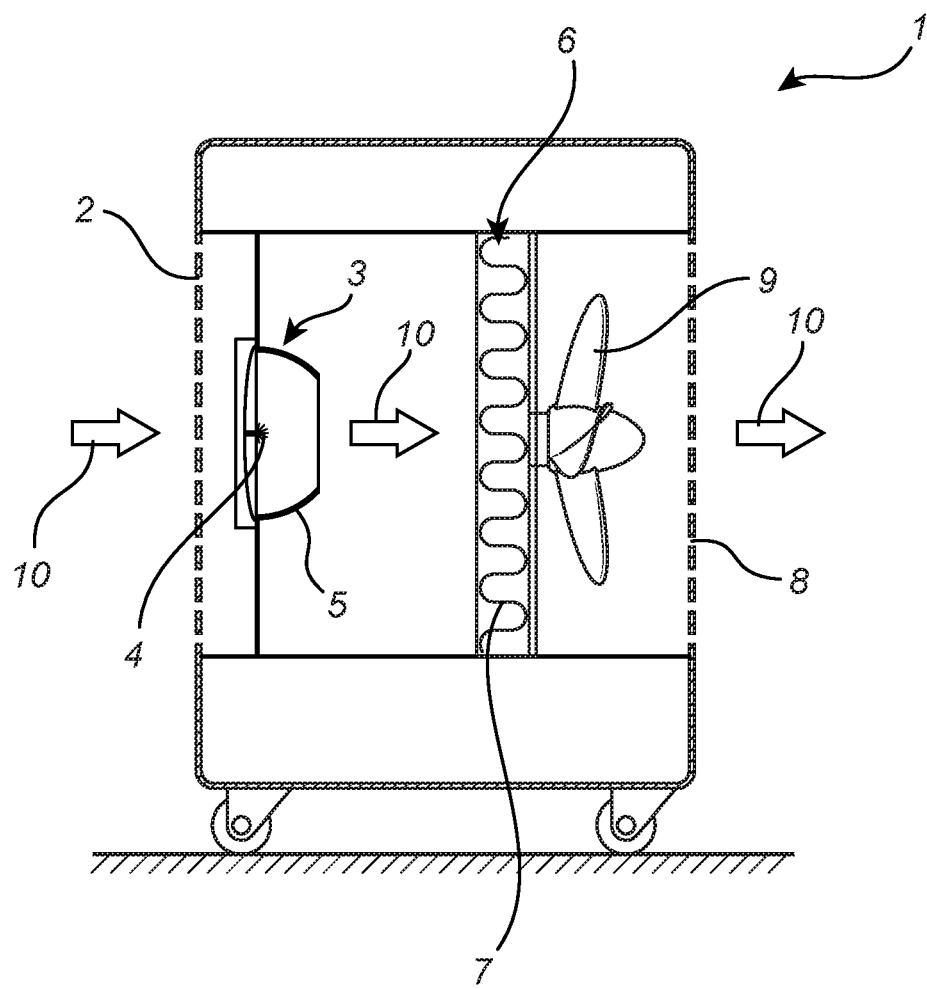
FIG. 1 shows an air cleaning device according to an embodiment.

An air cleaning device 1 according to an embodiment will be described with reference to FIG. 1. The air cleaning device 1 may comprise an ionizing unit 3 and a separating unit 6 arranged to clean air conducted through the air cleaning device 1. The air cleaning device 1 may further comprise an inlet 2 for taking in air and an outlet 8 for exhausting cleaned air and a fan 9 for generating an air flow 10 through the air cleaning device 1.

The separating unit 6 may comprise a filter 7 comprising fibers of a filter medium of a dielectric material, such as polypropylene. The filter 7 may be pre-charged (and may then be referred to as an electret filter) or non-pre-charged. The separating unit 6 may be arranged either upstream or downstream of the ionizing unit 3.

Figure 2:
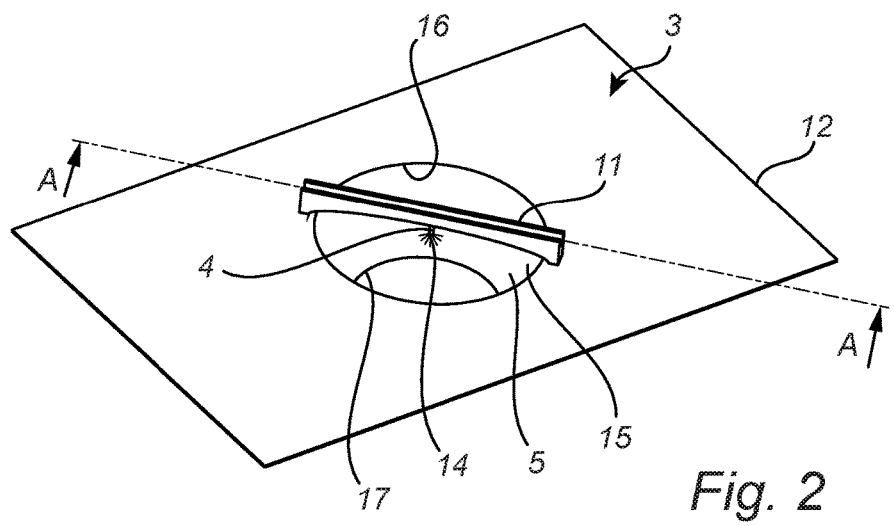
FIG. 2 is a perspective view of an ionizing unit of the air cleaner device shown in FIG. 1.
Figure 3:
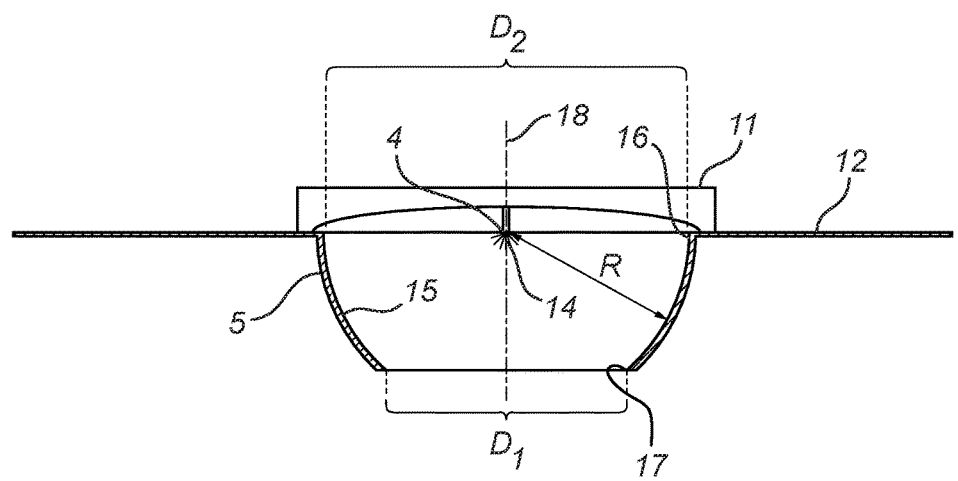
FIG. 3 is a cross-section taken along line A-A in FIG. 2.

The ionizing unit 3 will be described in more detail with reference to FIGS. 2 and 3. FIG. 3 is a cross-section taken along line A-A in FIG. 2. The ionizing unit 3 comprises at least one emitter electrode 4, which preferably may comprise at least one tip 14. In the present example, the emitter electrode 4 is a brush electrode comprising a plurality of tips 14. Alternatively, the emitter electrode 4 may e.g. be a needle tip electrode. The emitter electrode 4 may be held in place by a support 11.

The ionizing unit 3 may further comprise at least one collector electrode 5 arranged to conduct at least a portion of the flow of air 10 in the air cleaning device 1. For example, the collector electrode 5 may have a duct shape, such as tube-like shape. Further, the collector electrode 5 may have a spherically curved inner surface 15. Hence, the inner surface 15 may form a portion of a sphere. The emitter electrode 4 may be centered with respect to the spherically curved inner surface 15 of the collector electrode 5. That is, each point of the spherically curved inner surface 15 may be (at least almost) equidistant (such as by a distance R) from the center of the emitter electrode 4. The emitter electrode 4 may e.g. be positioned on a central axis 18 of the collector electrode. The collector electrode 5 may comprise an inlet 16 and an outlet 17 interconnected by the spherically curved surface 15. For example, the collector electrode 5 may have a gradually tapered shape extending from the inlet 16 to the outlet 17. The inlet 16 may have a larger diameter $D_2$ as compared to the diameter $D_1$ of the outlet 17. For example, a ratio of the diameter $D_1$ of the outlet 17 to the diameter $D_2$ of the inlet 16 may be comprised within the range of 0.25 to 0.75, such as within the range of 0.4 to 0.6, such as around 0.5. For example, the inlet 16 may have a diameter $D_2$ similar to the diameter of the spherical shape of the inner surface 15. The emitter electrode 4 may be positioned approximately at the center of the inlet 16 of the collector electrode 5.

Optionally, means, such as a plate 12, may be arranged so as to force a major portion, such as all of the air flow 10 through the collector electrode 5.

With reference again to FIG. 1, operation of the air cleaning device 1 will be described. When the air cleaning device 1 is operated, a voltage is applied over the emitter electrode 4 and the collector electrode 5, such as within the range of 3 to 15 kV. For example, the collector electrode 5 may be connected to ground. An electric field is thereby created, extending between the emitter electrode 4 and the collector electrode 5 and an ionization filed is created, in which airborne particles can be charged.

The fan 9 is operated so as to create an air flow 10 entering the air cleaning device 1 via the inlet 2 of the air cleaning device 1. The air flow 10 is further conducted by the collector electrode 5 (i.e. the air flow enters the inlet of the collector electrode 5 and then exits the collector electrode via the outlet of the collector electrode 5), thereby passing the ionization field. Corona discharge occurs at the emitter electrode 4, such that air molecules get charged (ionized). The charged air molecules travel along the electric field towards the spherically curved inner surface of collector electrode 5. During this travel the ionized air molecules collide with airborne particles in the flow of air conducted by the collector electrode 5, whereby the airborne particles get charged (ionized). The ionizing unit 3 is adapted (by the design of the electrodes 4, 5 and adaptation of the operating voltage) such that at least a major portion of the charged airborne particles continues to travel with the air flow out of the collector electrode 5 instead of adhering to the collector electrode 5. Eventually, the charged airborne particles hit the filter 7 of the separating unit 6. In case the filter medium of the filter 7 is pre-charged, the charged airborne particles are attracted, and adhere to oppositely charged filter fibers. In case the filter 7 comprises a filter medium of a dielectric material, the molecules of filter fibers are polarized when a charged particle come close to the fiber. Hence, the fibers of the filter 7 get charged by passing charged airborne particles. Charged airborne particles are then attracted, and adhere to the charged filter fibers. Thus, at least some (preferably a majority) of the charged airborne particles are attracted and captured by the separating unit 6. The air flow 10 now carrying a significantly reduced amount of airborne particles then exits the air cleaning device 1 via the outlet 8 of the air cleaning device 1.

The person skilled in the art realizes that the present invention by no means is limited to the embodiments described above. On the contrary, many modifications and variations are possible within the scope of the appended claims. For example, the air cleaning device may comprise not just one, but several pairs of emitter and collector electrodes. Further, the ionizing unit may be positioned downstream of the separating unit. The particles will then first be charged by the ionizing unit, then exit the air cleaning device and circulated in the room, and then enter the air cleaning device to be collected by the separating unit. Further, the separating unit and the ionizing unit may be arranged in separate (free standing) parts of the device. Hence, the ionizing unit part and separating unit part may be positioned on different locations of a space (such as a room). Further, the air cleaning device may be any type of device, such as a portable or stationary air cleaner, and may be adapted to be installed e.g. in a ceiling, in a vehicle or to stand on a floor.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. An air cleaning device comprising:
   a separating unit comprising a filter and configured to attract charged particles; and
   an ionizing unit configured to:
   charge airborne particles present in a flow of air, and transmit at least a portion of the charged particles towards the separating unit such that at least a portion of the charged particles are separated from the flow of air, the ionizing unit comprising at least one collector electrode and at least one emitter electrode, wherein the at least one collector electrode is shaped so as to conduct at least a portion of the flow of air, the at least one collector electrode has a spherically curved inner surface, and the emitter electrode is substantially centered with respect to the spherically curved inner surface of the collector electrode.

2. The air cleaning device as defined in claim 1, wherein the at least one collector electrode comprises an inlet and an outlet for the flow of air.

3. The air cleaning device as defined in claim 2, wherein a diameter of the inlet is larger than a diameter of the outlet.

4. The air cleaning device as defined in claim 3, wherein a ratio of the diameter of the outlet to the diameter of the inlet is comprised within the range of 0.25 to 0.75.

5. The air cleaning device as defined in claim 3, wherein a ratio of the diameter of the outlet to the diameter of the inlet is comprised within the range of 0.4 to 0.6.

6. The air cleaning device as defined in claim 2, wherein the spherically curved inner surface extends from the inlet to the outlet.

7. The air cleaning device as defined in claim 2, wherein a distance from the at least one emitter electrode to a center point of the spherically curved inner surface is less than 10% of the radius of the inlet.

8. The air cleaning device as defined in claim 1, wherein the filter comprises a filter medium configured to attract at least some of the charged particles.

9. The air cleaning device as defined in claim 8, wherein the filter medium comprises a dielectric material.

10. The air cleaning device as defined in claim 9, wherein the dielectric material comprises polypropylene.

11. The air cleaning device as defined in claim 1, wherein the ionizing unit is configured to operate within a range of 3 kV to 15 kV.

12. The air cleaning device as defined in claim 1, wherein the at least one emitter electrode comprises at least one tip substantially centered with respect to the spherically curved inner surface.

13. The air cleaning device as defined in claim 1, wherein the at least one emitter electrode comprises at least one of a brush electrode or a needle tip electrode.

14. The air cleaning device as defined in claim 1, further comprising a fan configured to produce said flow of air.

15. The air cleaning device as defined in claim 1, wherein the portion of the charged particles transmitted towards the separating unit comprises a majority of the charged particles generated by the ionizing unit.

16. A method for separating airborne particles from air, the method comprising:
   charging airborne particles present in a flow of air using an ionizing unit;
   conducting at least a portion of the flow of air via at least one collector electrode of the ionizing unit, wherein the at least one collector electrode is shaped so as to conduct at least a portion of the flow of air, and the at least one collector electrode has a spherically curved inner surface;

sending at least a portion of the charged particles towards a separating unit comprising a filter, wherein an emitter electrode of the ionizing unit is substantially centered with respect to the spherically curved inner surface of the collector electrode; and attracting at least a plurality of charged particles using the separating unit configured such that at least a portion of the plurality of charged particles are separated from the flow of air.

17. The method as defined in claim 16, wherein the portion of the charged particles transmitted towards the separating unit comprises a majority of the charged particles generated by the ionizing unit.

18. The method as defined in claim 16, wherein the filter comprises a filter medium that attracts the at least some of the charged particles.

* * * * *